United States Patent
Soriano

[11] Patent Number: 6,024,527
[45] Date of Patent: Feb. 15, 2000

[54] SHOPPING CART, LOADABLE FULL AND EFFORTLESSLY INTO A CAR TRUNK

[76] Inventor: Michel Soriano, 5, Avenue Jeanne d'Arc - 38100, Grenoble, France

[21] Appl. No.: 08/957,376

[22] Filed: Oct. 24, 1997

[30] Foreign Application Priority Data

Nov. 22, 1996 [FR] France .................................. 96/14614

[51] Int. Cl.$^7$ .................................................... B62B 3/02
[52] U.S. Cl. ................ 414/345; 280/33.991; 280/47.35; 254/2 R; 254/10 R; 414/340
[58] Field of Search ..................... 414/345, 343, 414/340, 392, 391, 399, 471, 917; 254/2 R, 2 B, 10 R, 10 B; 280/33.992, 991, 638, 639, 651, 47.34, 47.35

[56] References Cited

U.S. PATENT DOCUMENTS

| | | | |
|---|---|---|---|
| 2,904,237 | 9/1959 | Wasyluk | 280/47.35 |
| 2,906,497 | 9/1959 | Wolf | 254/10 B |
| 2,953,287 | 9/1960 | Werner . | |
| 3,118,553 | 1/1964 | Rosenweig | 280/651 |
| 4,251,178 | 2/1981 | Bourgraf et al. | 414/343 |
| 4,909,700 | 3/1990 | Fontecchio et al. | 254/10 B |
| 4,941,797 | 7/1990 | Smillie, III | 414/345 |
| 5,294,158 | 3/1994 | Cheng | 280/651 |
| 5,358,217 | 10/1994 | Dach | 254/2 R |
| 5,413,448 | 5/1995 | Peshkin | 414/343 |
| 5,503,424 | 4/1996 | Agopian | 280/651 |
| 5,538,386 | 7/1996 | Scheibel | 414/498 |
| 5,570,988 | 11/1996 | Gallaway et al. | 414/343 |
| 5,595,470 | 1/1997 | Berkey et al. | 254/2 R |
| 5,649,718 | 7/1997 | Groglio | 280/641 |
| 5,810,548 | 9/1998 | Stenudd | 280/651 |

FOREIGN PATENT DOCUMENTS

| | | |
|---|---|---|
| 2617786 | 1/1989 | France . |
| 2708898 | 2/1995 | France . |
| 2234472 | 2/1991 | United Kingdom . |

*Primary Examiner*—Robert P. Olszewski
*Assistant Examiner*—Isobel A. Parker
*Attorney, Agent, or Firm*—McDermott, Will & Emery

[57] ABSTRACT

The present invention relates to a cart for shopping in stores, loadable full and effortlessly into a car trunk. The cart includes a basket and a rolling support. The rolling support is placed in the car trunk when disconnected from rolling legs and basket supporting arms. The basket is movable with respect to the support and rotated by rods which form two deformable parallelograms. An electric or crank control transmits the synchronous motion to two reduction units located on either side of the basket. Thus, the basket is effortlessly laid into or extracted from the car trunk, passing the threshold.

7 Claims, 11 Drawing Sheets

60 cm Maxi

SHOPPING CART, LOADABLE FULL AND EFFORTLESSLY INTO A CAR TRUNK

BACKGROUND OF THE INVENTION

1. Field of the Invention

The present invention relates to a cart of the type used in supermarkets. It more specifically relates to a cart having a detachable basket which can be loaded full and effortlessly into a car trunk, then unloaded and rolled to the user's home.

2. Discussion of the Related Art

Generally, to shop in a supermarket, one has to find a cart, release it with a coin and take it into the store. The user must then put the purchases in bags upon passing at the pay-desk, then unload the bags one by one into his car trunk. The cart remaining on the purchase area, it has to be brought back to recover the coin. Once at home, the user unloads the bags from his car one by one and must take them home for storage. He must put them down to open doors, make several travels, etc. This operation which is often long and arduous is a really tedious task.

Carts likely to be loaded and unloaded full in a car trunk are known in the art. French patent application 2708898 describes a cart provided with a lever system enabling to lift the basket and deposit it in the trunk. The disadvantage of such a type of cart is the important effort required and the impossibility of passing high thresholds while allowing the basket to be deposited on the trunk floor. Further, the maximum width of the basket is 60 cm (pay-desk passage width), which considerably reduces the basket capacity with respect to what an average trunk, generally wider than 60 cm, can contain.

SUMMARY OF THE INVENTION

An object of the present invention is to provide a cart, the basket of which can be loaded and unloaded effortlessly in a trunk, even if the trunk threshold is high.

Another object of the present invention is to provide such a cart, the basket of which is of high capacity despite the narrow pay-desk passage width.

These objects are achieved by means of a goods transportation cart, including a basket mounted by two lateral arms on a rolling support such that it can be lifted and deposited into a vehicle trunk by passing an eventual threshold of the trunk. It further includes parallel rods articulated on the basket and the lateral arms, forming a deformable parallelogram system, and gear down means for rotating the rods synchronously.

According to an embodiment of the present invention, the rotating means are mounted in the basket.

According to an embodiment of the present invention, the rotating means include elements mounted in each of the lateral arms, the elements of one arm being connected to the elements of the other arm to ensure the synchronicity.

To achieve the above-mentioned objects, the lateral arms can also slide horizontally with respect to the support and the support can include means for displacing the lateral arms vertically.

According to an embodiment of the present invention, the lateral arms disconnect from the support and remain mounted on the basket.

According to an embodiment of the present invention, the support is foldable or dismountable so that its elements can be stowed around the basket in the trunk.

According to an embodiment of the present invention, the rolling direction of the cart is perpendicular to the direction of approach of the cart to deposit the basket into the trunk.

According to an embodiment of the present invention, the basket includes at least two internal rolling baskets and is provided with a front surface that can be folded back, facilitating the extraction of the internal baskets when they are in the trunk.

The foregoing objects, features and advantages of the present invention will be discussed in detail in the following non-limiting description of specific embodiments in connection with the accompanying drawings.

DETAILED DESCRIPTION

Figure 1:
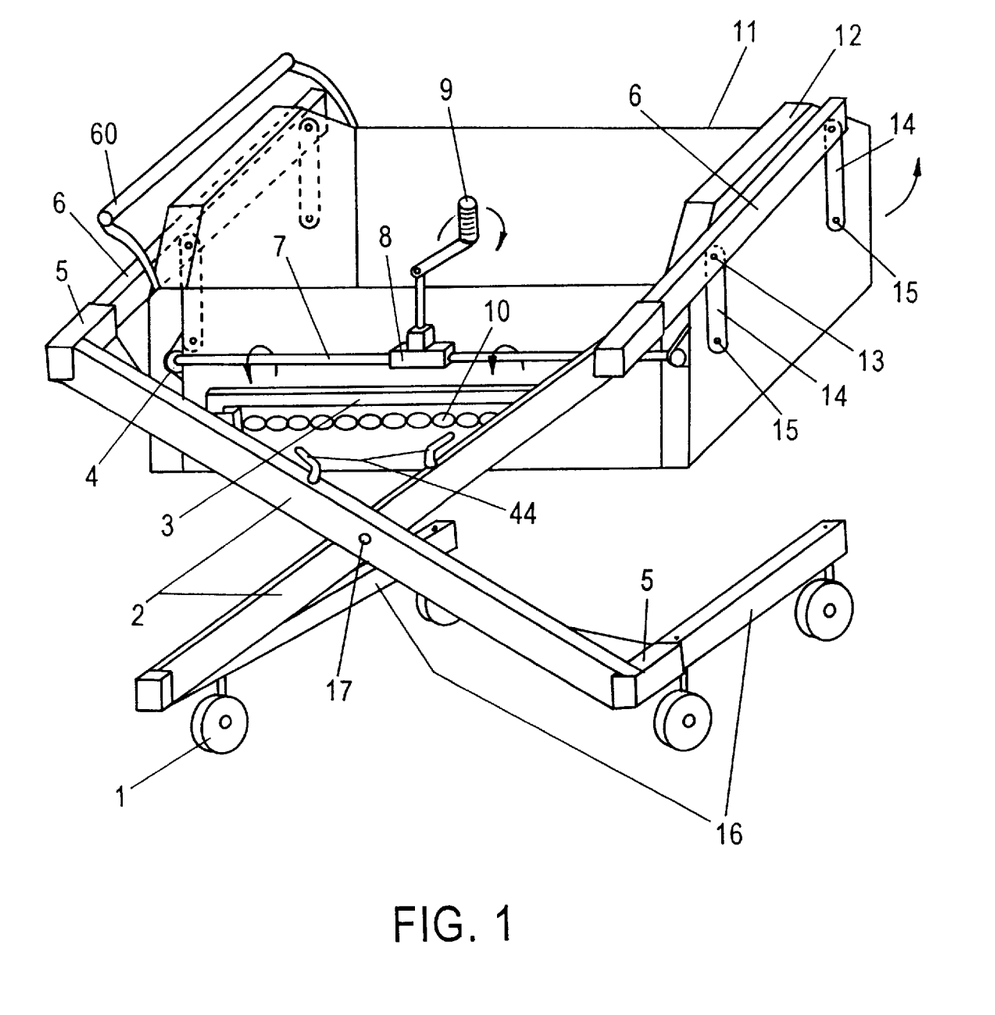
FIG. 1 shows a simplified general view of an embodiment of a crank-controllable cart according to the present invention with an X-shaped support.

In FIG. 1, an embodiment of a cart according to the present invention includes a support frame 2 formed of two X-assembled commercial steel profiles articulated on an axis 17. Their maximum spacing is determined by a chain 10 and they are held in position by a connectable spacer 3 which is disconnected to fold up the support. Each of the X-assembled branches ends with two casings 5 with stiffening ribs. The two bottom casings receive by connection two legs 16 which are provided with rollers 1 and thus constitute the rolling part of the cart.

The upper casings 5 receive by connection two, right and left arms 6 which support basket 11 by means, according to the present invention, of four rods 14 parallel to each other. Each rod 14 is pivotally mounted on an axis 13 of arm 6. The other end of each rod is rigidly mounted to an axis 15 of the basket. In other words, the rod rotates when axis 15 rotates. The four axes 15 are all rotated simultaneously and synchronously by two reduction systems located on both sides of basket 11 in right and left housings 12. The control of the system is performed by a crank 9 which rotates a shaft located in a protection tube 7 by means of a bevel gear 8. According to an alternative, the crank is replaced with a small electric motor mounted on the basket and powered by means of a flexible wire connected to a battery socket located in the car trunk. The control is then performed by means of a switch. An alternative construction consists of providing a central reduction unit located at the level of bevel gear 8 and which transmits the motion to the rods via the transmission shaft located in protection tube 7.

It should be noted that the loading of basket 11 in a trunk is performed perpendicularly to the rolling direction of the cart. The basket width should still remain compatible with the pay-desk passage, but the basket length can be equal to the trunk width, and not to its depth, which most often enables to increase the basket capacity.

Figure 2:
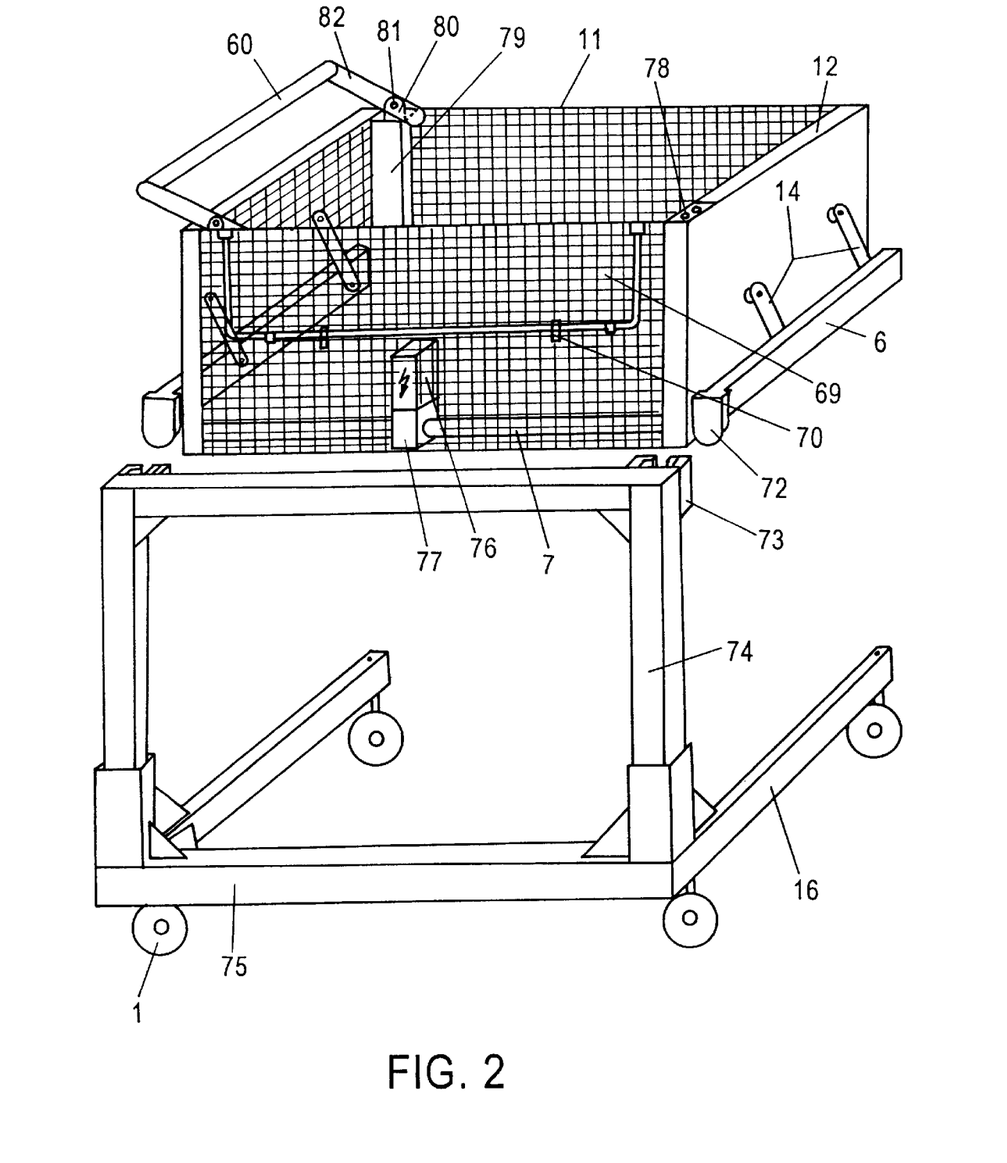
FIG. 2 shows a simplified general view of an embodiment of an electrically controllable cart according to the present invention with a U-shaped support. The basket has a flap that can be folded back and a retractable handle.

In FIG. 2, the support is U-shaped and formed of rolling legs 16 interconnected by a rear transverse member 75 which bears two vertical tubes to which vertical support 74 connects. Vertical support 74 has, at its upper portion, two openings 73 in which lateral arms 6 are connected. According to this embodiment, basket 11, self-propelling, is driven by a two-output motor reduction unit. Motor 76 is powered when 12-volt socket 78 is connected to the car battery by means of an electric cord located in the trunk. Motor 76 drives the two-output reduction unit 77, which itself drives the two lateral reduction units via the axis located in sleeve 7. It should be noted that when the basket has been deposited in the car trunk, the motion is continued to disconnect members 73 and 72 which are mounted by cooperating T-shapes, allowing a sliding tangent to the rotating motion. Arms 6 driven by rods 14 can then be further rotated. Arms 6 will thus bear on the trunk floor and displace the basket to the back of the trunk. This operation creates sufficient room between the basket and the trunk threshold to stow support 74 in the trunk after disconnecting it from the rolling support. The two arms take place on both sides of the basket and the transverse member takes place between the basket and the trunk threshold (wherefrom the name "U-shaped support"). The rolling support, also U-shaped, is then also placed in the trunk with the wheels on both sides of the basket and transverse member 75 at the back between the trunk threshold and the basket.

It should be noted that the basket has a flap 69 which can be folded back around hinges 70. The presence of a handle 60 which can be folded back should also be noted, as well as rods 80 and 82 articulated on axis 81 and bearing upon a stop located on the basket. By pulling handle 60 upwards, the stop is avoided and rods 80 and 82 align and the assembly retracts into the two tubes 79 located in the basket angles.

As an alternative, vertical tubes 74 may be articulated to rolling support 16 and the upper transverse member is thus omitted. Tubes 74 then fold up on support 16. It should be noted that the cross-sections of the supports may be square, rectangular, circular, oblong, etc.

Figure 3:
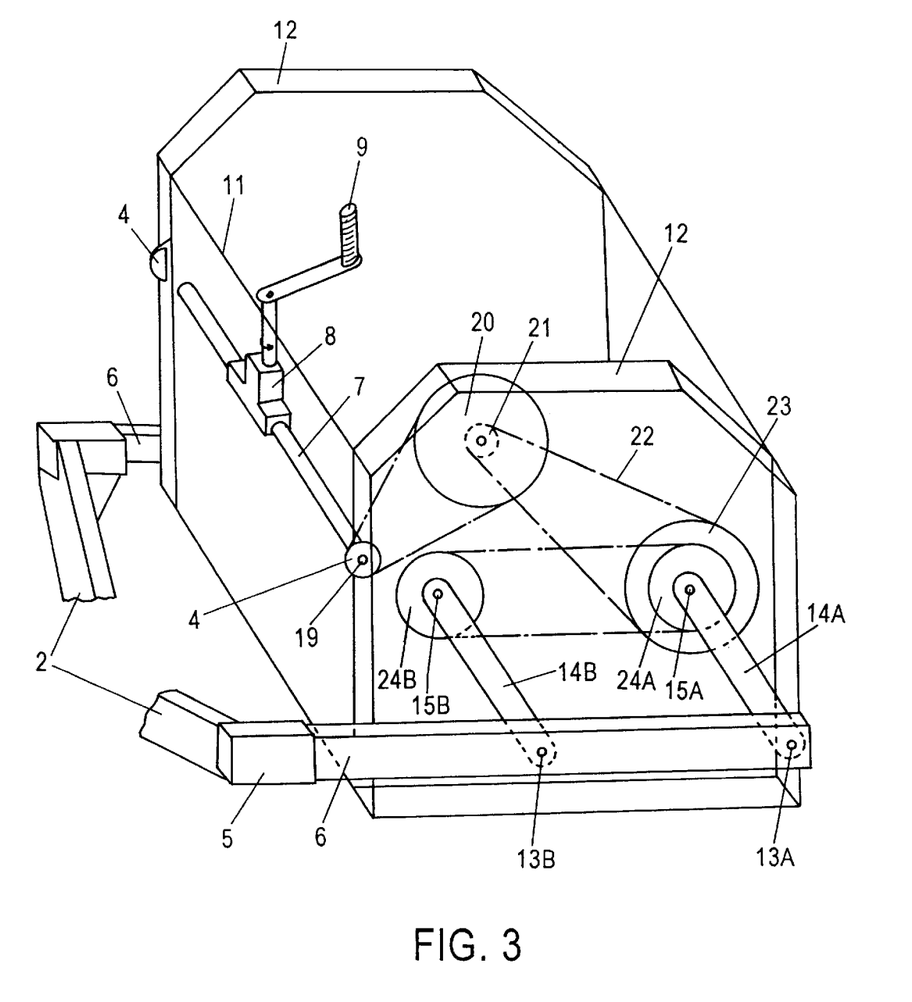
FIG. 3 shows lateral chain reduction units and their manual control with rods forming deformable parallelograms.
Figure 20:
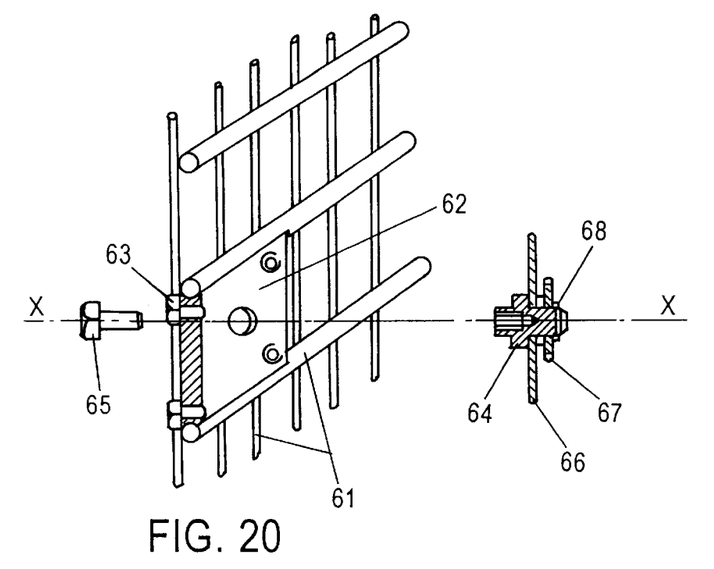
FIG. 20 shows an assembly detail of the axes supporting the pinions (chain configuration) for a basket made from welded wires.

FIG. 3 shows a chain reduction unit usable in a basket according to the present invention to displace rods 14. Bevel gear 8 is rotated either by crank 9, or by a small electric motor (not shown). Similarly, the drive of the two reduction units may be performed directly at the end of axis 19 and may be located elsewhere on basket 11. In this configuration, bevel gear 8, with a cross drive shaft, rotates axis 19 located in protection sleeve 7. Axis 19 is integral with small diameter pinion 4, which drives large diameter pinion 20 by means of a chain. Pinions 20 and 21 are rigidly fixed together and mounted idle on an axis fixed on the right side of basket 11. The principle of this mounting on a welded wire basket is shown in FIG. 20. Pinion 21 in turn drives pinion 23 by means of a chain 22. Pinion 23, pinion 24A, and the corresponding front rod 14A are rigidly connected together and mounted idle on axis 15A which is fixed on the right side of basket 11. Pinion 24A synchronously rotates its homologue 24B of same diameter which is rigidly connected to rear rod 14B, by means of a chain; they are mounted idle on axis 15B, also fixed on the right side of basket 11. It should be noted that the pinion diameter and the number of reduction stages may be varied, which results in varying the reduction ratio, and thus the effort required for the displacement of the basket, as well as the speed.

Thus, the rotation of crank 9 causes the synchronous rotation (with gearing down) of rods 14A and 14B around axes 15A and 15B. By doing so, the parallelograms thus formed by the right-hand and left-hand sides of basket 11 distort, wherein points 13A and 13B on arms 6 of support 2 are fixed. This distortion of the parallelograms causes a circular translating motion of basket 11 which enables to position it effortless at different positions of normal use or loading/unloading.

Figure 4:
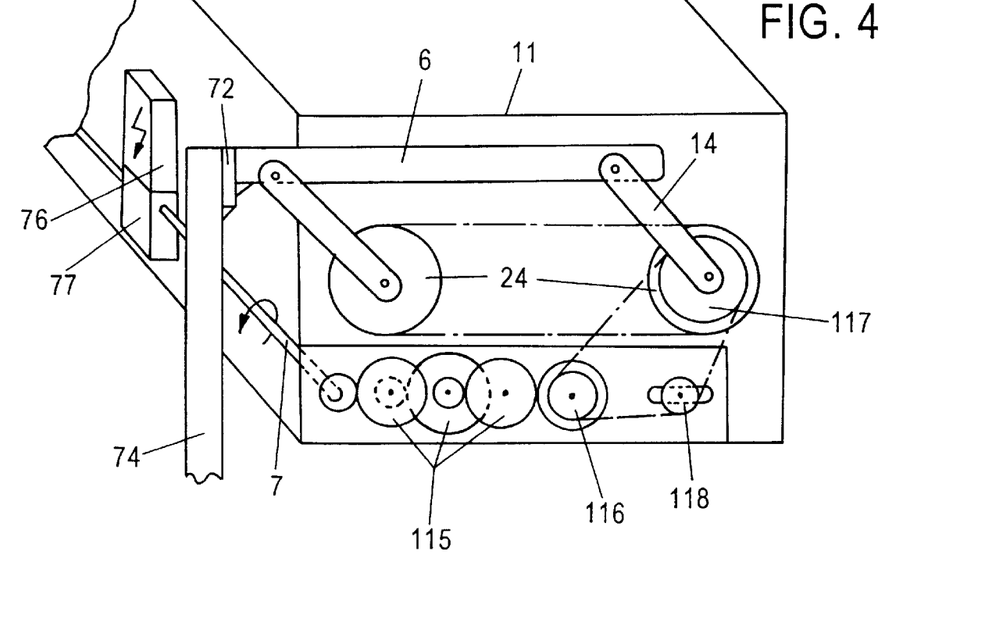
FIG. 4 shows an alternative of the reduction units with the gearing down being performed by a gear train.

FIG. 4 shows, as an alternative, a gear train reduction unit 115. A chain pinion 116 drives rods 14 with a pinion 117. A chain tightener 118 is provided.

Figure 5:
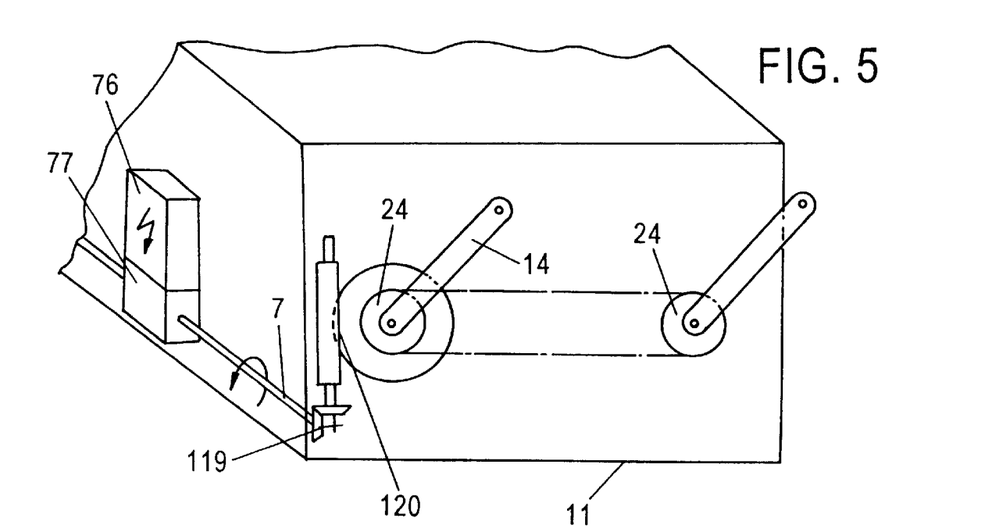
FIG. 5 shows an alternative of the reduction units with the gearing down being performed by a wheel and ball screw system.

FIG. 5 shows, as an alternative, a wheel and ball screw reduction unit 120 which drives wheels 24 connected to rods 14. The motion is transmitted from motor reduction unit 76 and 77 via conical gear pair 119.

Figure 6:
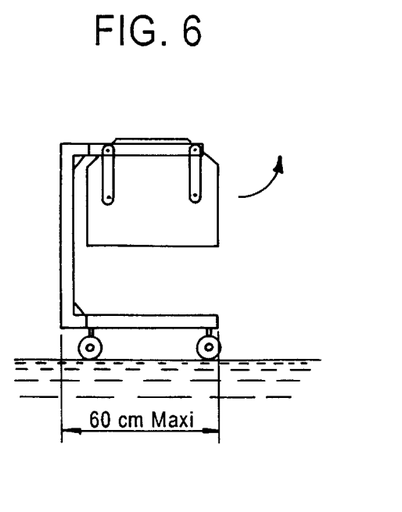
FIG. 6 shows the general view of the cart with the basket in a lowered position for shopping.

FIG. 6 shows the cart in a lowered position, for shopping. This position ensures a high stability, the center of gravity being the lowest possible. The width bulk then does not exceed the 60 cm admissible for passing at the supermarket pay-desks.

Figure 7:
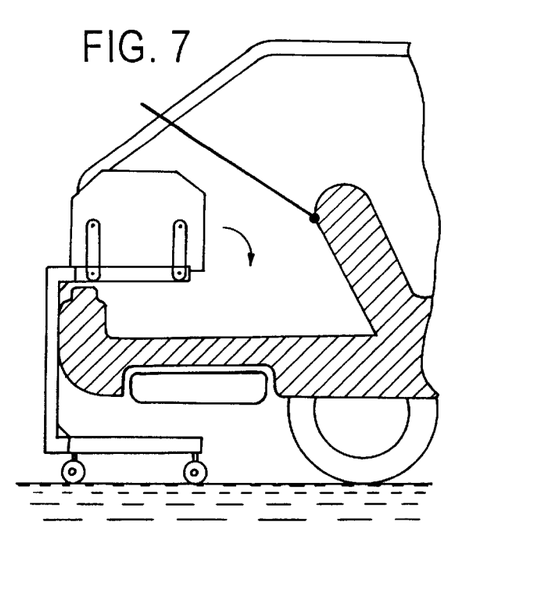
FIG. 7 shows the setting to a raised position of the basket for introduction in the trunk while passing a threshold.

FIG. 7 shows the cart in a raised position to pass the threshold of the car trunk. The approach of the car is enabled by the cantilever shape of the support, the wheels of which roll under the car. It should be noted that the approach of the car is performed in the transverse direction, that is, at a 90° angle with respect to the rolling direction of the cart, which enables to adapt as best as possible the basket dimensions to the trunk dimensions:

basket width (max. 60 cm)≈usable trunk depth
basket length≈usable trunk width (greatest dimension)
basket height≈available trunk height The cart is thus rolled lengthwise and approaches the car widthwise. Handle 60 is positioned accordingly.

Figure 8:
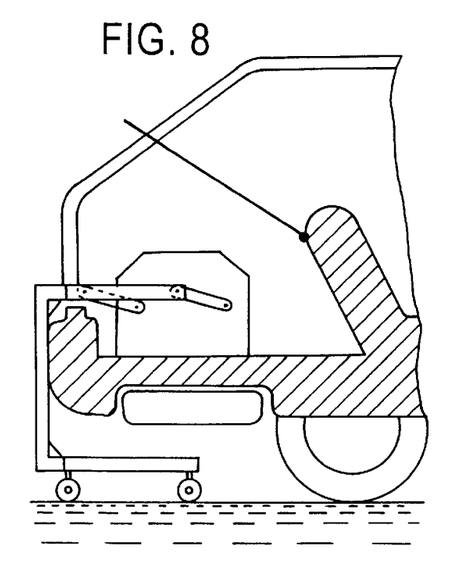
FIG. 8 shows a position of deposition into the trunk.

FIG. 8 shows the cart in the trunk loading position. According to the shapes of the car trunk, the basket dimensions are adapted and its sides may have beveled corners to facilitate the introduction into the trunk.

Figure 9:
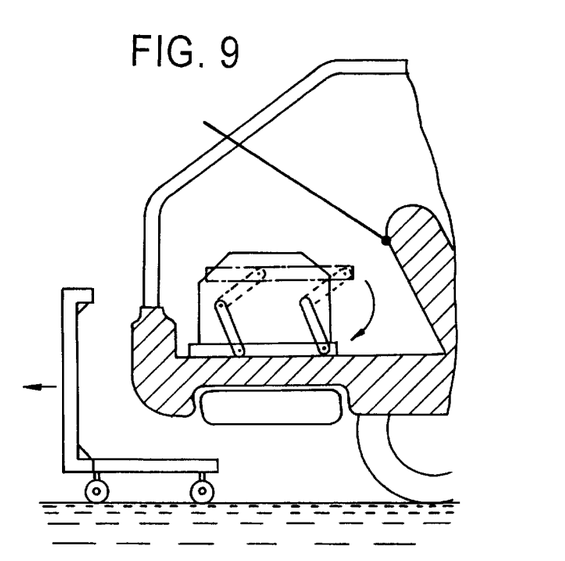
FIG. 9 shows a position of detachment from the support and folding up of the lateral arms in the trunk.

In FIG. 9, the support is detached from the basket (T-shape connection or sliding tubes). Arms 6 are then rotated by the rods and moved within the trunk down to the floor, which will enable, by the bearing of arms 6 on the floor, to displace the basket to the back of the car trunk. This displacement could also be obtained with rollers under the basket.

Figure 10:
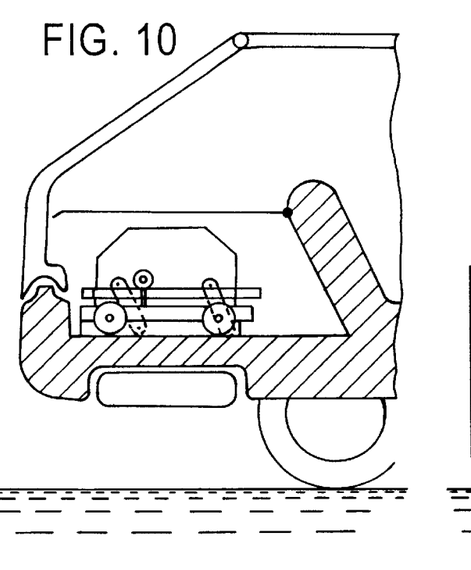
FIG. 10 shows the entire support folded up in the trunk with the full basket.

In FIG. 10, the support is disassembled and folded up in the trunk.

The U-shaped portion is placed between the basket and the trunk threshold, as well as the legs with the rollers which are placed on both sides of the basket. The trunk can then be closed. It should be noted that, with the X-shaped assembly, the two branches of the X and the rolling legs 16 may remain interconnected, and once the arms of the X are folded together, the whole set may be directly placed in the trunk, or axis 17 is detached and the two half supports are positioned in the trunk on both sides of the basket.

Figure 11:
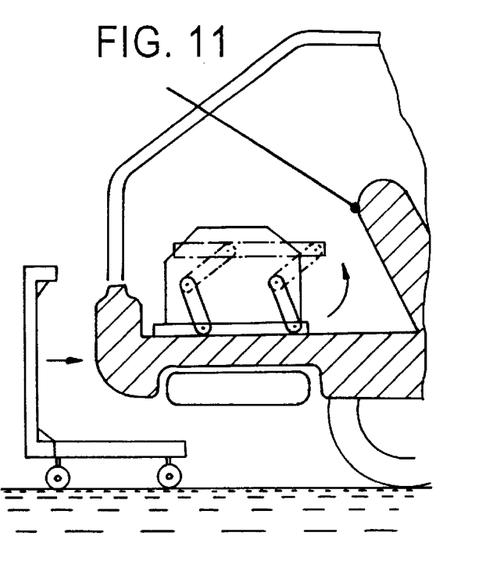
FIG. 11 illustrates the unloaded support and the repositioning of the support arms for connection.

In FIG. 11, the support is unloaded, assembled, then brought close to the car. By operating the crank (or by electric control), arms 6 are set back in position and connected to the vertical support.

Figure 12:
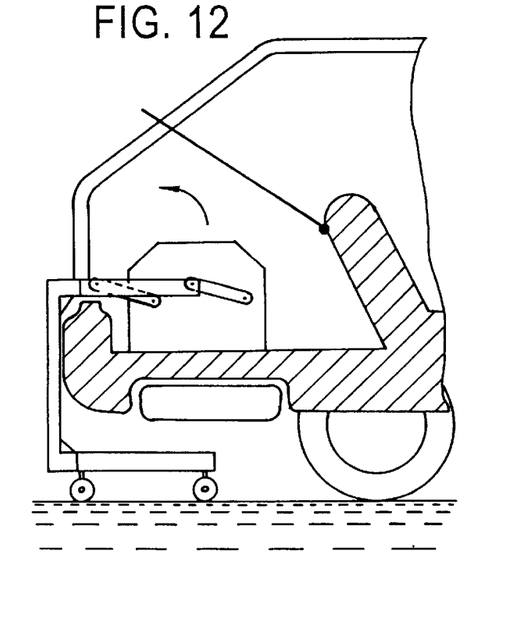
FIG. 12 illustrates the principle of the inverse extraction motion of the basket.

In FIG. 12, by operating the crank or by electric control, the basket is set back at the raised position (with a very low effort despite a 60 to 80 kg basket, due to the gearing down). The raised position of the basket enables its extraction from the car trunk while passing the threshold, and pulling the cart backwards.

Figure 13:
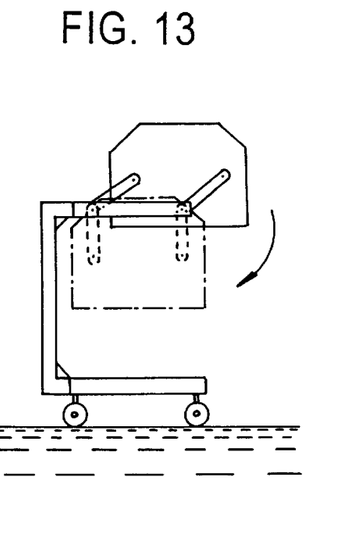
FIG. 13 illustrates the repositioning of the basket to the lowered position for displacement.

In FIG. 13, by operating the crank or by electric control, the basket is brought back to a lowered use position. After unloading, the cart is brought back to the car to be stowed in the garage or in the trunk. It can also be stowed in a closet with a folding basket option, wherein the lateral surfaces fold against the bottom. The cart will thus await its next use.

Figure 14:
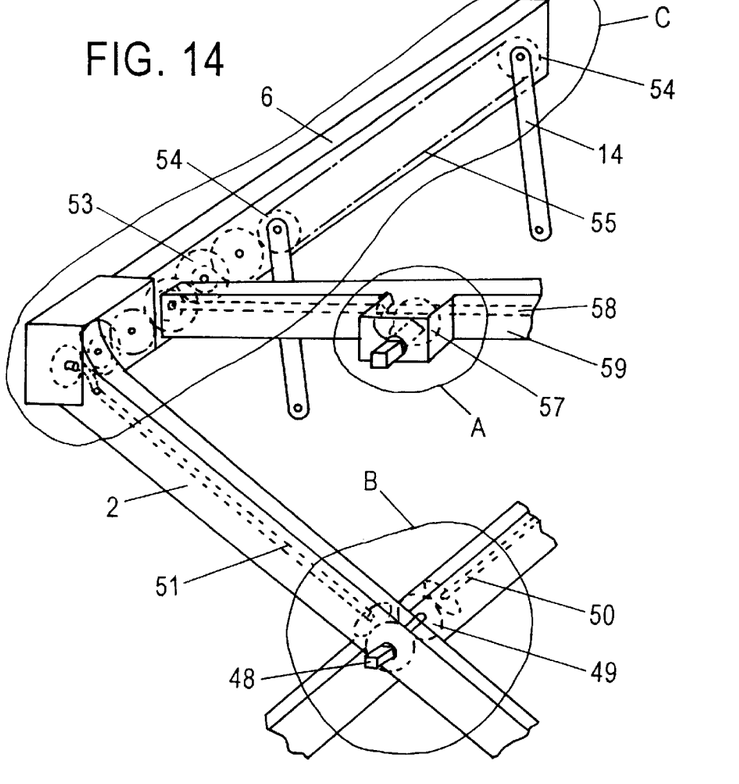
FIG. 14 shows a partial view of a specific embodiment of the support which incorporates the lateral reduction units in the support arms (with two different centralized control modes).

FIG. 14 shows, in the same diagram, a reduction system housed in arms 6 with two possible control systems (only one being necessary). It should be noted that the essential difference of this alternative is that the reduction units are located on the fixed support and rotate basket 11, whereas in the previous solution, the reduction units are located on basket 11 which is thus self-propelling. For alternative 1: see FIG. 15, the control is performed with axis 48 of the "X" by means of a bevel gear 49 which transmits the rotation inside both arms 6 via shafts 50 and 51 located in the two branches 2 of the X-shaped support. The two gear systems located in arm 6 and in support 2 engage upon connection of the arm and the support. The motion is thus transmitted to gear system 53 which will drive synchronously, after reduction, pinions 54 interconnected by a chain 55. Rods 14 will thus be simultaneously driven.

Figure 15:
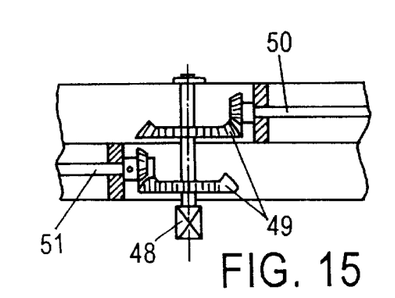
FIG. 15 shows a detail in cross-sectional view of the centralized control located on the articulation of the X-shaped support.
Figure 16:
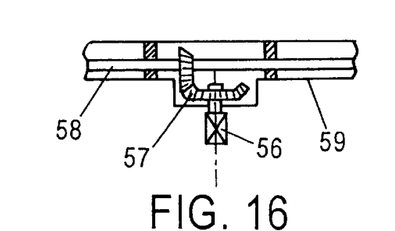
FIG. 16 shows a cross-sectional detail of the centralized control located, according to an alternative, on a transverse member connecting the two lateral arms.

FIG. 15 shows a top cross-sectional view of the control system on axis 48. As alternative 2: see FIG. 16, the control is performed with axis 56 and with a conical pinion gear 57 which transmits the motion to gear system 53 via transmission shaft 58. There should thus be a motion inversion on one side (one additional pinion) in order to have homogeneous and synchronous rotation. The assembly is housed in transverse member 59 which connects the two arms 6 and comes against basket 11 at the time when arms 6 are disconnected from support 2.

Figure 17:
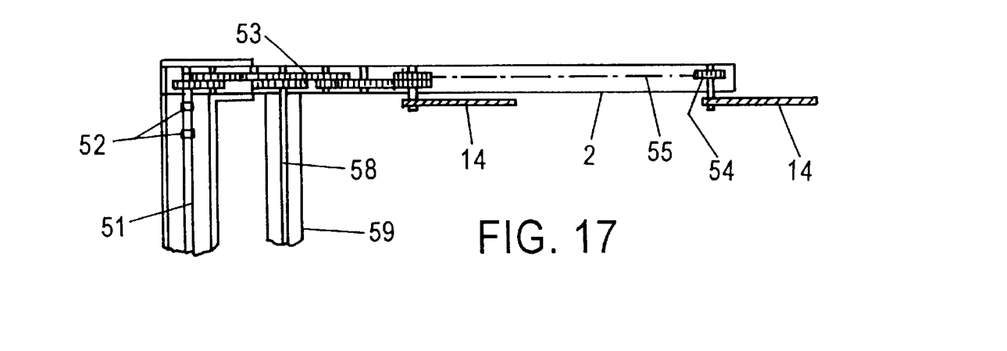
FIG. 17 illustrates a top view of the gear reduction units in a support arm with the two possible control modes shown in the preceding drawings.

FIG. 17 shows a top cross-sectional view of the entire transmission system which, by engagement through small and large diameter gears, forms a reduction unit enabling to considerably reduce the effort to be provided to displace the basket. Note the link by angle joint 52, necessary in the transmission. Further, it is possible to replace the shown transmission with wheel and ball screw systems located on supports 6 at the level of the axis of rods 14.

Figure 18:
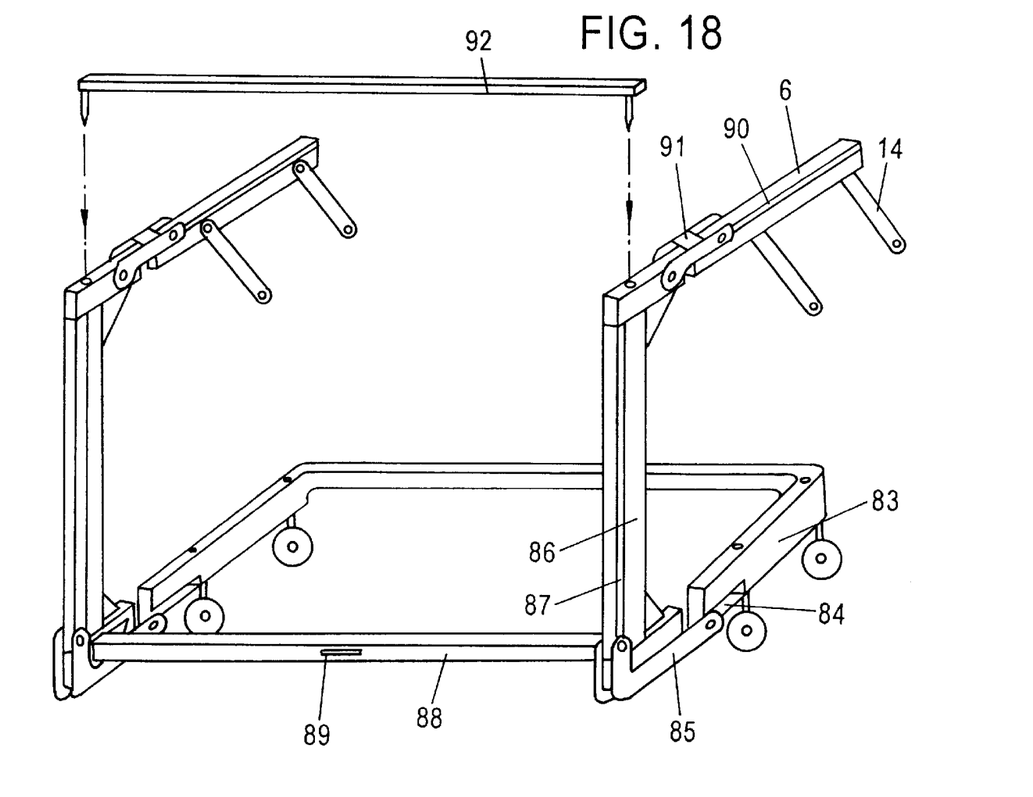
FIG. 18 shows another embodiment of the dismountable support with slide bars and rods.

FIG. 18 shows a support, all the elements of which are fixed together via levers which slide in slots. When lateral arms 6 are driven onto the bottom of the car trunk, they in turn drive supports 86 by means of levers 91. The user will accompany vertical supports 86 and will slide them to the back of the trunk by sliding them along slots 90 in arms 6. Similarly, in turn, roller support 83 will slide on supports 86, causing a displacement of levers 85 in slots 87 and 84. It should be noted that vertical support 86 is previously disconnected from roller support 83 by pushing lever 89 located on transverse member 86. This is simply a cable and pawl centralized unlocking.

Figure 19:
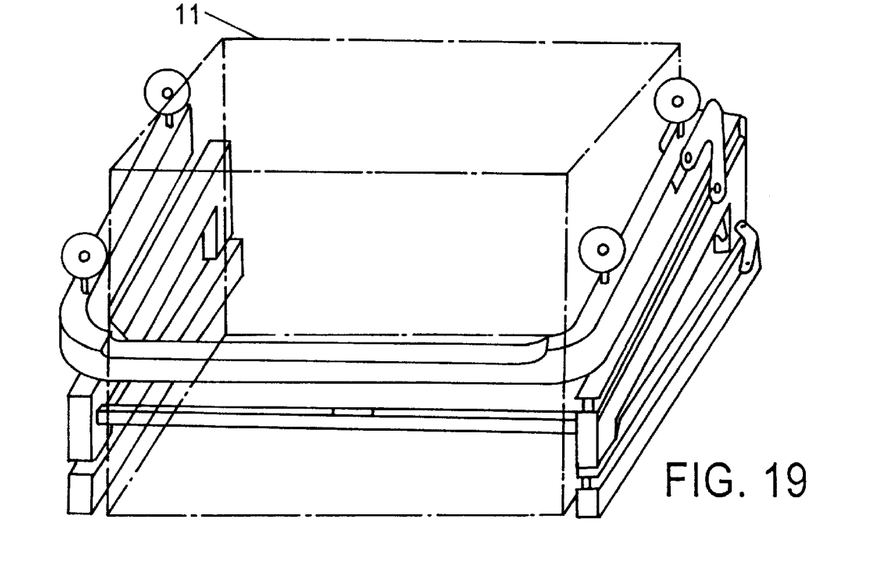
FIG. 19 shows the support of FIG. 18 folded up in the trunk.

FIG. 19 shows the entire support according to FIG. 18, once folded in the trunk on both sides of the basket.

FIG. 20 shows, according to an alternative, chain reduction units located on the basket sides, and a fixation mode of the axes of the reduction units which carry the pinions driving the chains. Their fixing by means of plates 62 on the basket wires can be performed by welding or by screws 63 which block plate 62 against wires 61. Axis 64 is itself fixed on plate 62 by a screw 65 or by welding. Axis 64 here bears two pinions 66 and 67 maintained in place by an elastic ring 68 or by any other means. The design differs according to the function of pinions 66 and 67, here interconnected by welding on a same spacer.

Figure 21:
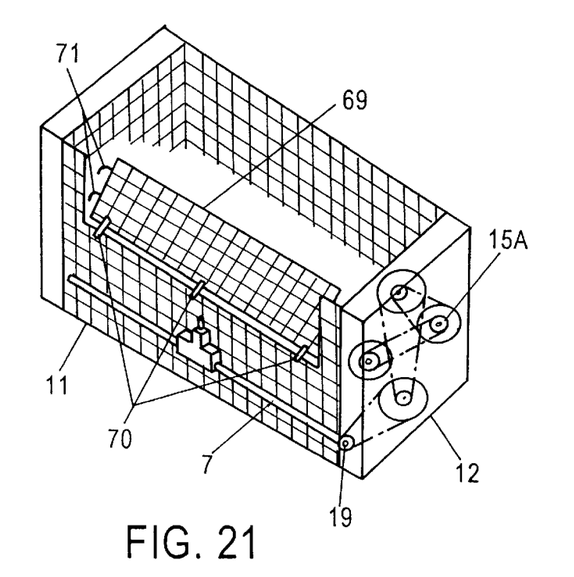
FIG. 21 shows a welded wire basket with a front flap which can be folded back.

FIG. 21 shows implementation details of a flap 69, this flap being articulated on three oblong hinges 70. Hooks 71 on both sides enable to hook the flap on the lateral walls of basket 11. In this embodiment, axis 19 in tube 7 is at the bottom of the basket. As an example, a lateral reduction unit is shown with an additional reduction stage to further reduce the effort.

Figure 22:
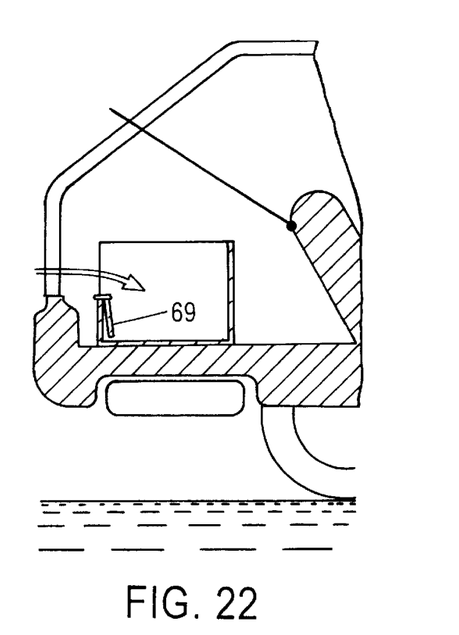
FIG. 22 shows a basket in a car trunk with a front flap which can be folded back.

FIG. 22 shows a specific embodiment of a welded wire basket with, on the front side, a foldable flap 69, which enables to easily put objects into the basket when empty in the car trunk.

Figure 23:
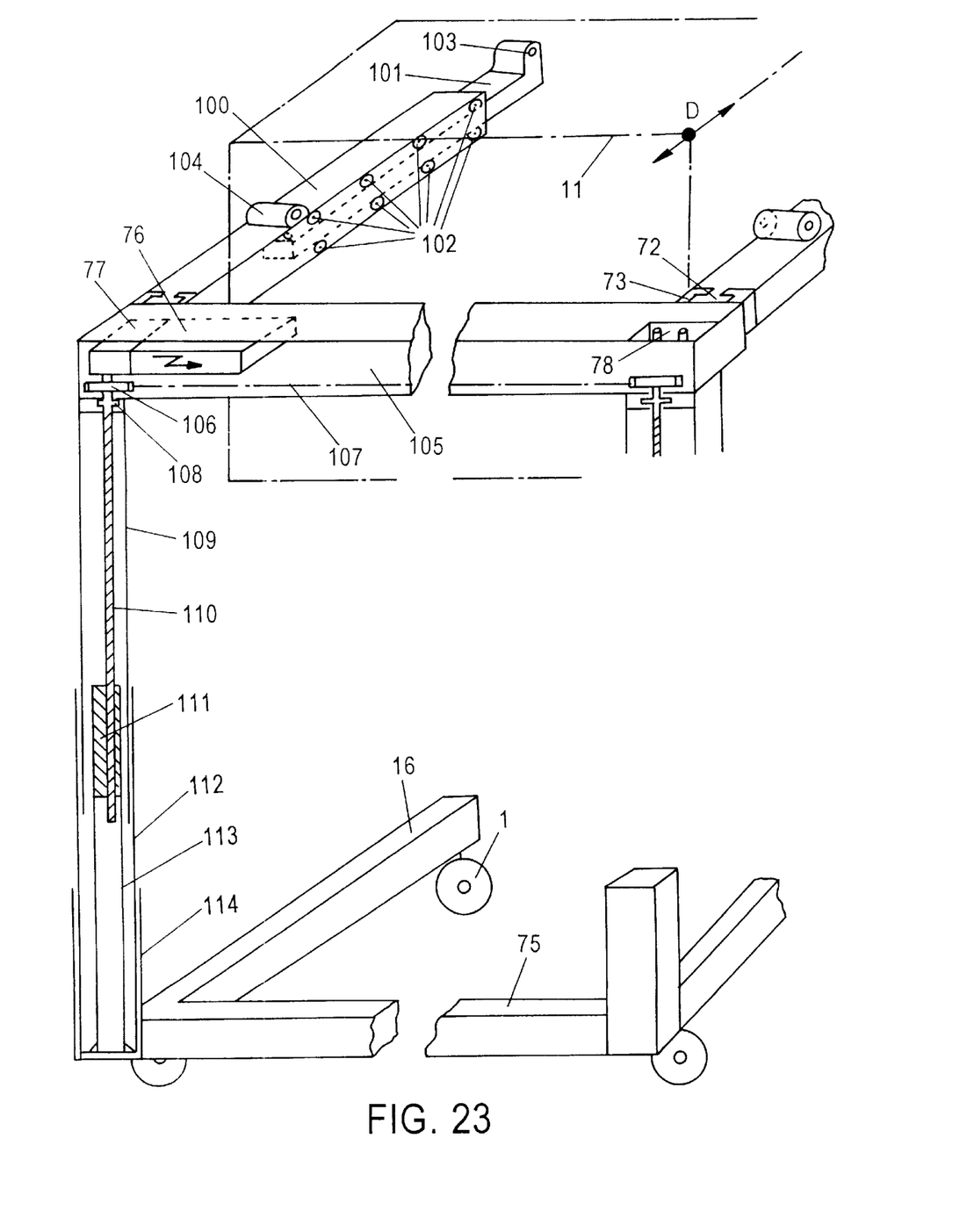
FIG. 23 shows an embodiment in which the displacement of the basket is obtained by a vertical motion of the support and a horizontal motion of the basket.

FIG. 23 shows an embodiment of the upper part of a support of the type of FIG. 2 enabling loading and unloading of the basket by combining a vertical motion with a horizontal motion of the basket.

The two vertical supports are formed of a telescopic assembly. A screw 110 is driven by motor reduction unit 77 and its sliding motion is impeded by a shoulder 108. Its rotation occurs in tube 109 and it engages nut 111 which is integral with rectangular tube 113, which thus moves as a piston without rotating. The assembly moves inside sheath 112, itself connected to vertical tubes 114 of the roller support, the system being symmetrical. The powering of electric motor 76 by power supply 78 transmits the motion to both screws 110 which are interconnected by means of two pinions 106 and of a chain 107. The assembly is located in upper transverse member 105.

A vertical motion is thus obtained enabling to bring the basket to its lowered position for shopping, to its raised position for passing the threshold, then to its intermediary position to lay the basket down in the car trunk. The two lateral arms 100 are connected to the vertical support by a T-assembly of 72 into 73. Basket 11 is laid on two rollers 104 of the two arms 100. Tubes 101 connect to arms 100 and slide on upper and lower rollers 102 which are fixed to tubes 100. The basket is hung on the two distal ends 103 of tubes 101.

Thus, once in the raised position obtained by means of the telescopic vertical screw supports 110, the user will only have to slightly push the basket forwards, which causes the sliding of tubes 101 into 100, ensuring that the basket is maintained. This motion enables to pass the threshold. Bringing down the basket by means of the vertical telescopic support lays the basket in the trunk. By continuing this downward motion, opening 72 automatically disconnects from 73 and the lateral arms remain connected to the basket within the trunk. To stow the vertical support in the trunk, it is displaced upwards for extraction from tubes 114, and the two "forks" formed by the vertical telescopic supports find place on both sides of the basket while transverse member 105 goes between the trunk threshold and the basket. The roller support is also stowed similarly in the car trunk, transverse member 75 being also placed between the basket and the trunk threshold.

To extract the basket from the trunk, one will just operate in a strictly reverse manner. It should be noted that, when shopping, the basket will be maintained blocked against transverse member 105 by means of a single hook. It should also by specified that the extreme positions of the vertical telescopic system are defined by stops.

Figure 24:
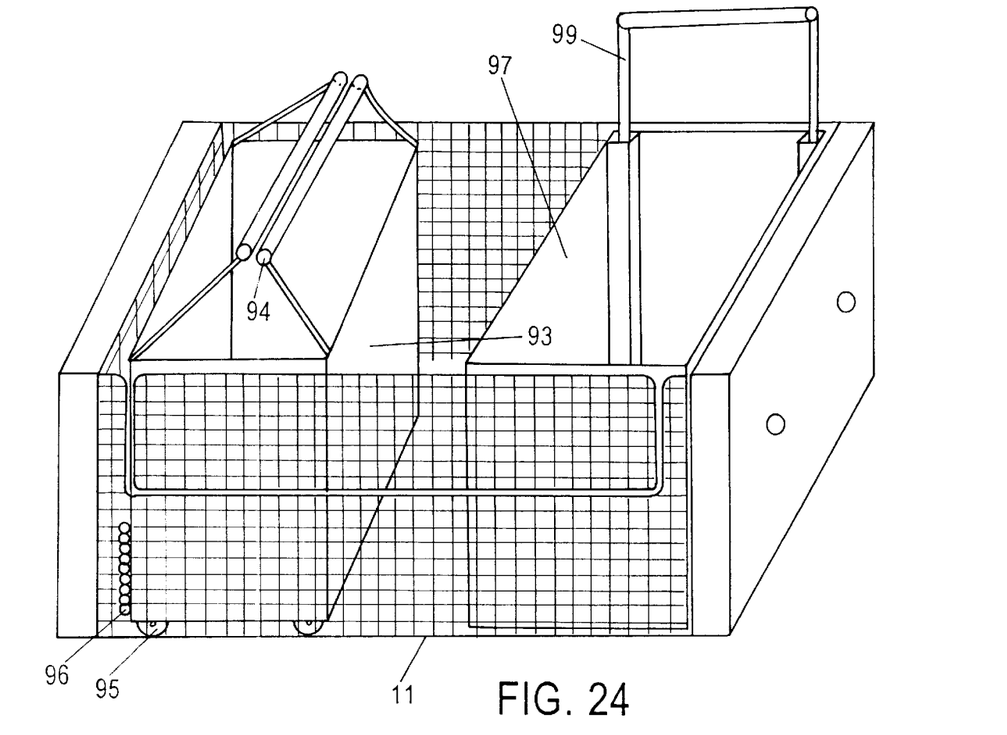
FIG. 24 shows a basket with internal baskets.
Figure 25:
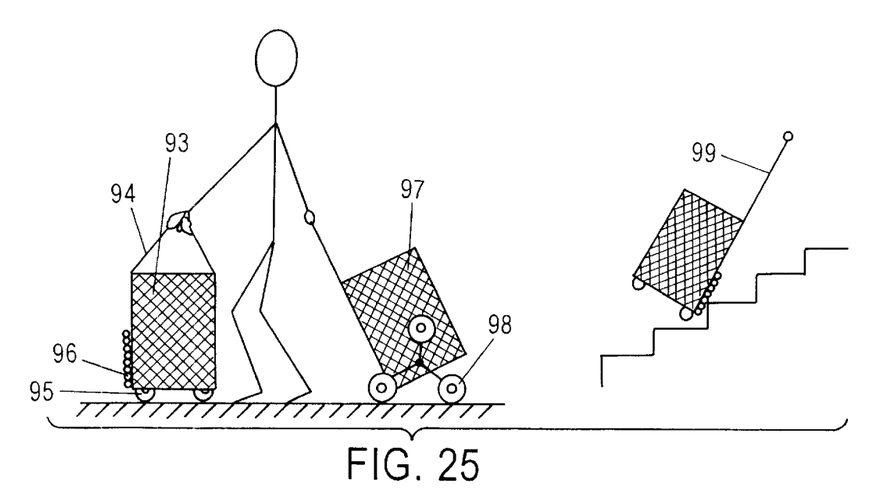
FIG. 25 shows a use of the internal rolling baskets.

FIG. 24 illustrates a solution usable when the cart cannot be rolled to the apartment of the user due to the presence of stairs. Then, inside main basket 11, two foldable baskets 93 or 97 of large dimensions are provided, in which the goods will be stowed. Once arrived at destination, baskets 93 or 97 are extracted from the trunk and will be easily taken to the user's apartment according to FIG. 25. For this purpose, they are provided at their lower part either with small rollers 95 and front rollers 96, or with triangle rollers 98 available on the market. Foldable baskets 93 or 97 and their retractable handles 94 or 99 will be folded up and laid flat in main basket 11, thus leaving the volume of basket 11 available.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A goods transportation cart, including a basket mounted by two lateral arms on a rolling support such that it can be lifted and deposited in a vehicle trunk by passing an eventual threshold of the trunk, including parallel rods (14) articulated on the basket and the lateral arms, forming a deformable parallelogram system, and gear down means for rotating the rods synchronously.

2. The cart of claim 1, wherein the rotating means are mounted in the basket.

3. The cart of claim 1, wherein the rotating means include elements (53, 54) mounted in each of the lateral arms, the elements of one arm being connected to the elements of the other arm to ensure the synchronicity.

4. The cart of claim 1, wherein the lateral arms are disconnectable from the support and remain mounted on the basket.

5. The cart of claim 1, wherein the support is foldable or dismountable such that its elements can be stowed around the basket in the trunk.

6. The cart of claim 1, wherein the rolling direction of the cart is perpendicular to a direction of discharge of the basket for depositing the basket in the trunk.

7. The cart of claim 1, wherein the basket includes at least two internal rolling baskets and is provided with a front surface that can be folded back, facilitating the extraction of the internal baskets when they are in the trunk.

* * * * *